(12) United States Patent
Bushnell et al.

(10) Patent No.: US 11,880,235 B2
(45) Date of Patent: Jan. 23, 2024

(54) ELECTRONIC DEVICES WITH ENHANCED DISPLAY AREAS

(71) Applicant: Apple Inc., Cupertino, CA (US)

(72) Inventors: Tyler S. Bushnell, Mountain View, CA (US); John N. Border, Campbell, CA (US); Victoria C. Chan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 653 days.

(21) Appl. No.: 16/813,457

(22) Filed: Mar. 9, 2020

(65) Prior Publication Data

US 2020/0356139 A1 Nov. 12, 2020

Related U.S. Application Data

(60) Provisional application No. 62/846,529, filed on May 10, 2019.

(51) Int. Cl.
  *G06F 1/16* (2006.01)
  *G02B 1/14* (2015.01)
  (Continued)

(52) U.S. Cl.
  CPC ............. *G06F 1/1609* (2013.01); *G02B 1/14* (2015.01); *G02B 5/0221* (2013.01); *G02B 5/0263* (2013.01); *G02B 27/30* (2013.01)

(58) Field of Classification Search
  CPC ......... G06F 1/1609; G06F 3/041; G02B 1/14; G02B 5/0221; G02B 5/0263; G02B 27/30;
  (Continued)

(56) References Cited

U.S. PATENT DOCUMENTS

| 7,914,196 B2 | 3/2011 | Parker et al. |
| 8,572,893 B2 | 11/2013 | Watanabe |

(Continued)

FOREIGN PATENT DOCUMENTS

| CN | 102460281 A | 5/2012 |
| CN | 104217655 A | 12/2014 |

(Continued)

OTHER PUBLICATIONS

Machine Translation of JP-2013195458-A (Year: 2013).*
Machine Translation of KR 20160139127 A (Year: 2016).*

*Primary Examiner* — William R Alexander
*Assistant Examiner* — Matthew Y Lee
(74) *Attorney, Agent, or Firm* — Treyz Law Group, P.C.; G. Victor Treyz; Tianyi He

(57) ABSTRACT

An electronic device display and a display cover layer may be coupled to a housing. The display may have an array of pixels that are configured to emit light. One or more light redirecting elements may be incorporated into the electronic device that redirect and thereby change the direction of light rays emitted from peripheral pixels in the display. The light redirecting elements may be used to enlarge the effective size of the display, to create images on sidewall surfaces of the display cover layer, and/or to create diffuse glowing areas around the periphery of the device. Light redirecting elements may be formed as integral portions of a display cover layer, as laminated optical films on a display cover layer, or as coating layers on a display cover layer. Afocal optical systems may be formed by placing first and second light redirecting elements on opposing first and second sides of a display cover layer.

20 Claims, 8 Drawing Sheets

(51) Int. Cl.
*G02B 5/02* (2006.01)
*G02B 27/30* (2006.01)

(58) Field of Classification Search
CPC ............... G02B 5/0231; G02B 3/0006; G02F 1/133331; G02F 1/133308; G02F 2203/02; G09F 9/30; H05K 5/0017
See application file for complete search history.

(56) References Cited

U.S. PATENT DOCUMENTS

| | | | |
|---|---|---|---|
| 10,109,232 | B2 | 10/2018 | Rappoport et al. |
| 10,185,200 | B1 * | 1/2019 | Sprague .................. G02F 1/167 |
| 10,672,858 | B2 | 6/2020 | Lee et al. |
| 2012/0069273 | A1 * | 3/2012 | Watanabe ......... G02F 1/133526 349/64 |
| 2013/0083080 | A1 | 4/2013 | Rappoport et al. |
| 2013/0279088 | A1 | 10/2013 | Raff et al. |
| 2014/0092028 | A1 | 4/2014 | Prest et al. |
| 2014/0132488 | A1 * | 5/2014 | Kim .......................... G09G 3/30 345/76 |
| 2014/0355227 | A1 * | 12/2014 | Lim .................. G02F 1/133305 361/749 |
| 2015/0185767 | A1 | 7/2015 | S. |
| 2015/0219834 | A1 | 8/2015 | Nichol et al. |
| 2016/0041323 | A1 | 2/2016 | Ma et al. |
| 2017/0082784 | A1 | 3/2017 | Niu |
| 2017/0269742 | A1 | 9/2017 | Arola |
| 2018/0128973 | A1 * | 5/2018 | Powell ..................... G02B 6/06 |
| 2018/0292864 | A1 | 10/2018 | Prest et al. |
| 2019/0067411 | A1 | 2/2019 | Lee et al. |
| 2019/0108816 | A1 | 4/2019 | Peana et al. |
| 2020/0014415 | A1 * | 1/2020 | Lee ..................... H04M 1/0249 |
| 2020/0150334 | A1 | 5/2020 | Yamada et al. |

FOREIGN PATENT DOCUMENTS

| | | | | |
|---|---|---|---|---|
| CN | 104813475 | A | 7/2015 | |
| CN | 109427862 | A | 3/2019 | |
| EP | 2439582 | A1 | 4/2012 | |
| GB | 2568134 | A | 5/2019 | |
| JP | 2011022265 | A | 2/2011 | |
| JP | 2013164498 | A | 8/2013 | |
| JP | 2013195458 | A * | 9/2013 | .......... G02F 1/1333 |
| JP | 2013195458 | A | 9/2013 | |
| JP | 2019045861 | A | 3/2019 | |
| KR | 1020090058984 | A | 6/2009 | |
| KR | 1020140142418 | A | 12/2014 | |
| KR | 1020160074763 | A | 6/2016 | |
| KR | 20160139127 | A * | 12/2016 | ............... G02B 5/02 |
| KR | 20190024270 | A | 3/2019 | |
| RU | 2011153689 | A | 7/2013 | |
| TW | 201913610 | A | 4/2019 | |
| WO | 2010140537 | A1 | 12/2010 | |
| WO | 2014011389 | A2 | 1/2014 | |
| WO | 2019017443 | A1 | 1/2019 | |

\* cited by examiner

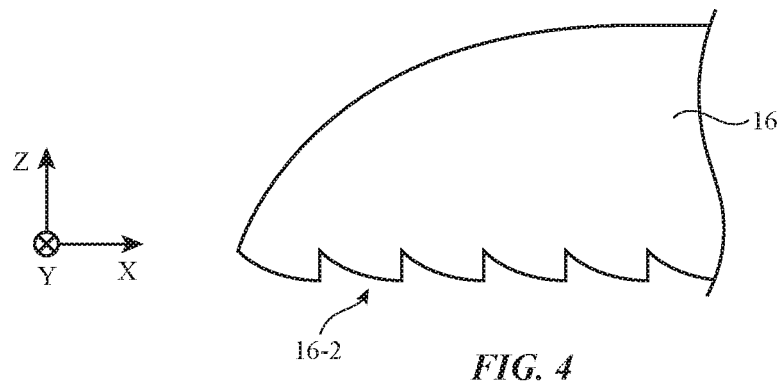
*FIG. 4*
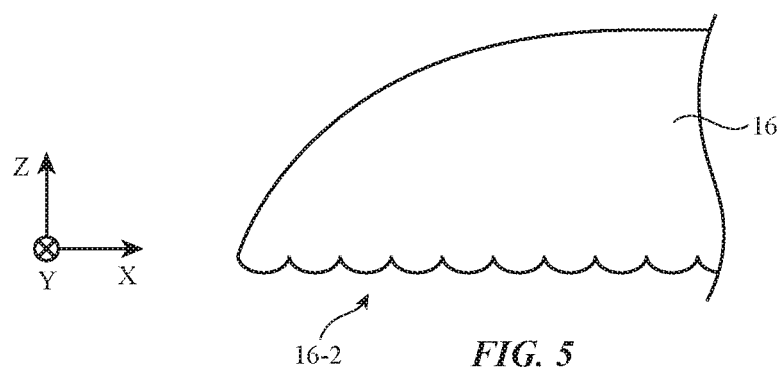
*FIG. 5*
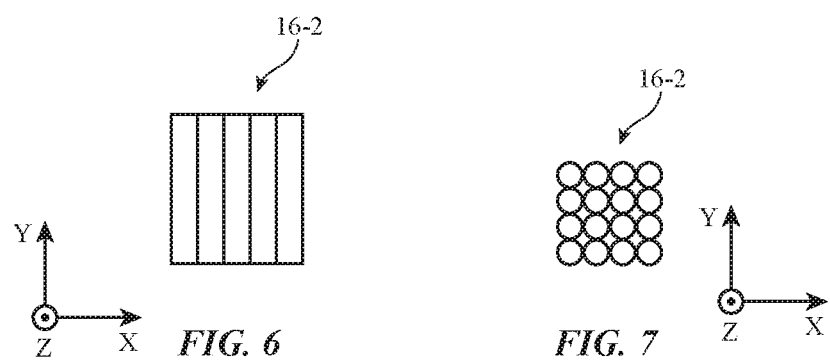
*FIG. 6*  *FIG. 7*

ELECTRONIC DEVICES WITH ENHANCED DISPLAY AREAS

This application claims the benefit of provisional patent application No. 62/846,529, filed May 10, 2019, which is hereby incorporated by reference herein in its entirety.

BACKGROUND

Field

This relates generally to electronic devices, and, more particularly, electronic devices with displays.

Electronic devices may have displays. Displays have arrays of pixels for displaying images for a user. To prevent damage to the pixels, the pixels can be covered with a transparent display cover layer.

It can be challenging to incorporate a display cover layer into an electronic device. If care is not taken, peripheral regions of the display cover layer may introduce distortion or may be associated with undesired inactive display borders.

SUMMARY

An electronic device may have a housing with an interior. Electrical components may be mounted within the interior. A display and a display cover layer that overlaps the display may be coupled to the housing.

The display may have an array of pixels that are configured to emit light. One or more light redirecting elements may be incorporated into the electronic device to redirect light emitted from peripheral pixels in the display. The light redirecting elements may be used to enlarge the effective size of the display, to create images on curved or planar sidewall surfaces of the display cover layer, and/or to create diffuse glowing areas around the periphery of the device.

Light redirecting elements may be refractive light redirecting elements that refract light rays and/or may be diffractive light redirecting elements that diffract light. The light redirecting elements include lenses such as Fresnel lenses, lenticular lenses, and arrays of semispherical microlenses (e.g., lenses with round outlines), may include holograms, and may include gratings and other optical elements. Light redirecting elements may be formed as integral portions of a display cover layer, as laminated optical films on a display cover layer, or as coating layers on a display cover layer. The display cover layer may have portions with curved cross-sectional profiles and may have planar portions.

In some configurations, afocal optical systems may be formed using first and second light redirecting elements on opposing first and second sides of a display cover layer.

BRIEF DESCRIPTION OF THE DRAWINGS

FIGS. 4 and 5 are cross-sectional side views of edge portions of display cover layers in accordance with an embodiment.

FIGS. 6 and 7 are diagrams showing illustrative lens patterns that may be used on portions of a display cover layer in accordance with an embodiment.

DETAILED DESCRIPTION

An electronic device may have a display. The display may have an array of pixels for creating an image. The image may pass through a protective display cover layer that overlaps the array of pixels. To minimize display borders, optical elements may be formed on the upper and/or lower sides of the display cover layer. The optical elements may include optical layers that redirect light (e.g., by refraction and/or diffraction). As an example, the optical elements may include lenses, holograms, gratings, or other light-redirecting elements. Light-redirecting elements may be formed from coatings, optical structures formed from portions of a glass member or other transparent layer that forms a display cover layer, and/or optical films that are laminated onto a display cover layer surface (e.g., using heat and/or pressure and, if desired, using adhesive). Light-redirecting elements on a display cover layer may help direct light from peripheral pixels in a pixel array in a desired direction (e.g., towards peripheral display cover layer edge surfaces, outward towards a user along the outermost peripheral portions of a display cover layer, etc.).

Figure 1:
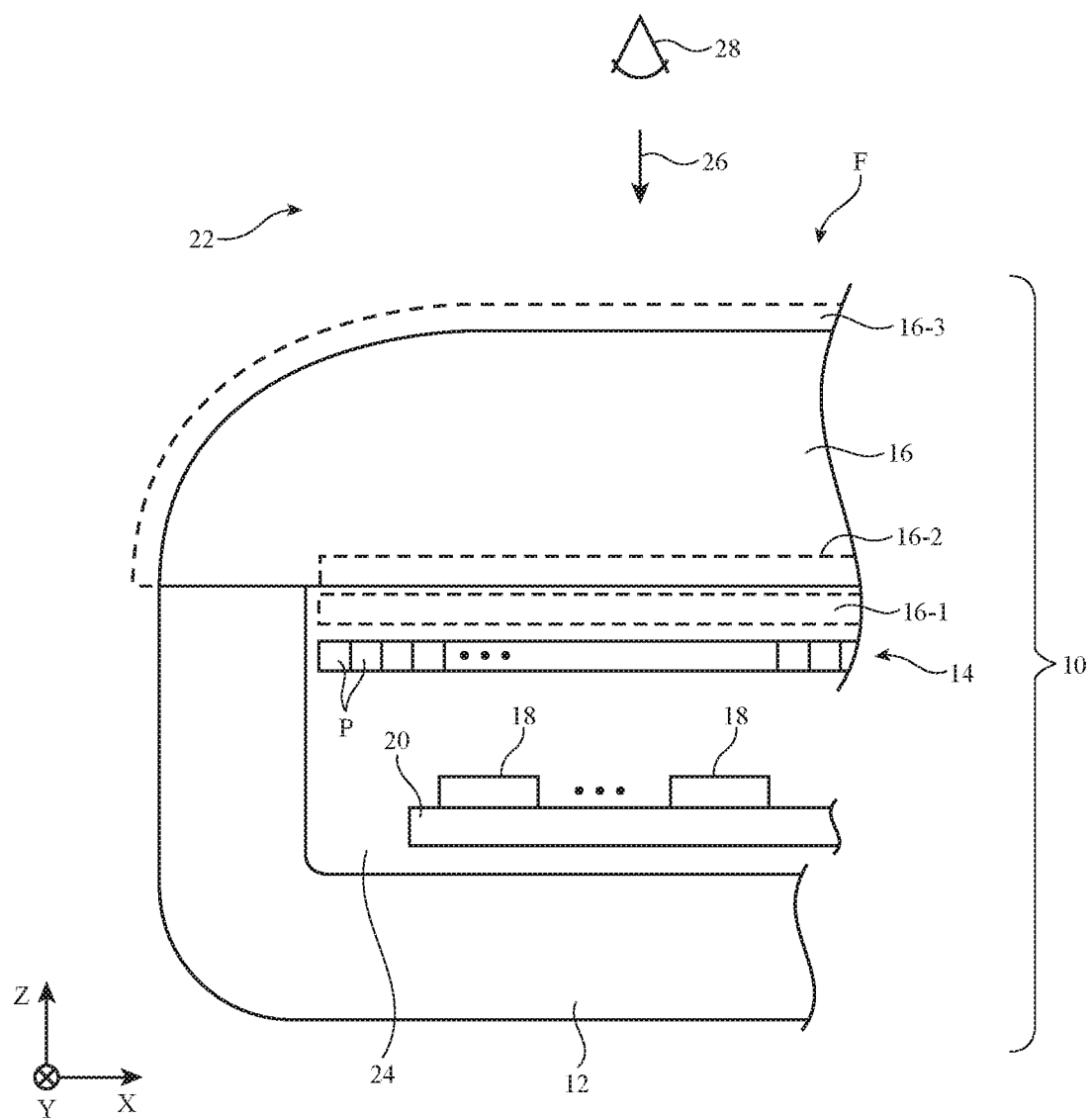
FIG. 1 is a side view of an illustrative electronic device with a display cover layer in accordance with an embodiment.

A cross-sectional side view of a portion of an illustrative electronic device with a display cover layer that includes light redirecting elements is shown in FIG. 1. In the example of FIG. 1, device 10 is a portable device such as a cellular telephone, wristwatch, or tablet computer. Other types of devices may have display cover layers with light redirecting elements, if desired.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays. Displays for device 10 may have pixel arrays for displaying images for a user. As shown in FIG. 1, display 14 of device 10 may have an array of pixels P. Display 14 may be an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. Display 14 may include rigid display structures and/or may be a flexible display. For example, a light-emitting diode display may be sufficiently flexible to be bent.

Each pixel array in device 10 (which may sometimes be referred to as a display panel, display substrate, or display) may be mounted under a transparent display cover layer that helps to protect the pixel array. In the example of FIG. 1, display (pixel array) 14 is mounted under display cover layer 16, which serves as a protective transparent covering for display 14 (and which may sometimes be referred to as forming a transparent portion of the housing for device 10). Display cover layer 16 may be attached to other portions of device 10 (e.g., housing 12 of FIG. 1) using an elastomeric gasket, adhesive, fasteners, a bezel, and/or other attachment mechanisms. In some arrangements, display cover layer 16 may have a portion forming a transparent cover for display 14 and may have an integral portion that forms housing sidewalls, a rear housing wall, or other portions of housing 12.

Display cover layer 16 may be formed from a single transparent member (e.g., a single planar transparent member) of glass, a crystalline material such as a layer of sapphire, clear polymer, etc. and/or display cover layer 16 may be formed from one or more laminated layers of one or more of these transparent materials. In some configurations, display cover layer 16 may include Anderson localization material or a fiber optic layer formed from a coherent fiber bundle. Coating layers (e.g., antireflection layers, oleophobic coating layers, etc.) may be incorporated, if desired.

During operation, the pixels of display 14 produce image light that passes through display cover layer 16 for viewing by a user such as viewer 28 who is viewing device 10 in direction 26. To help expand the effective size of display 14 (e.g., laterally outward in the X-Y plane so that the image area is larger when viewed by viewer 28) and/or to otherwise modify the optical properties of display 14, one or more light redirecting elements may be incorporated into device 10. The light redirecting elements may be located adjacent to one or more edge of the display 14. These light redirecting elements may include lenses, holograms, gratings, and/or other structures for redirecting light. As shown in FIG. 1, light redirecting elements may be formed between the inner surface of display cover layer 16 and display 14 (see, e.g., light redirecting element 16-1), may be formed from portions of display cover layer 16 (see, e.g., light redirecting element 16-2 which is formed from a portion of display cover layer 16 on the inner surface of display cover layer 16 that faces display 14 and interior 24 and that faces away from exterior 22), and/or may be formed on the outer surface of display cover layer 16 (see, e.g., light redirecting element 16-3, which faces away from display 14 and interior 24 and faces exterior 22).

Figure 2:
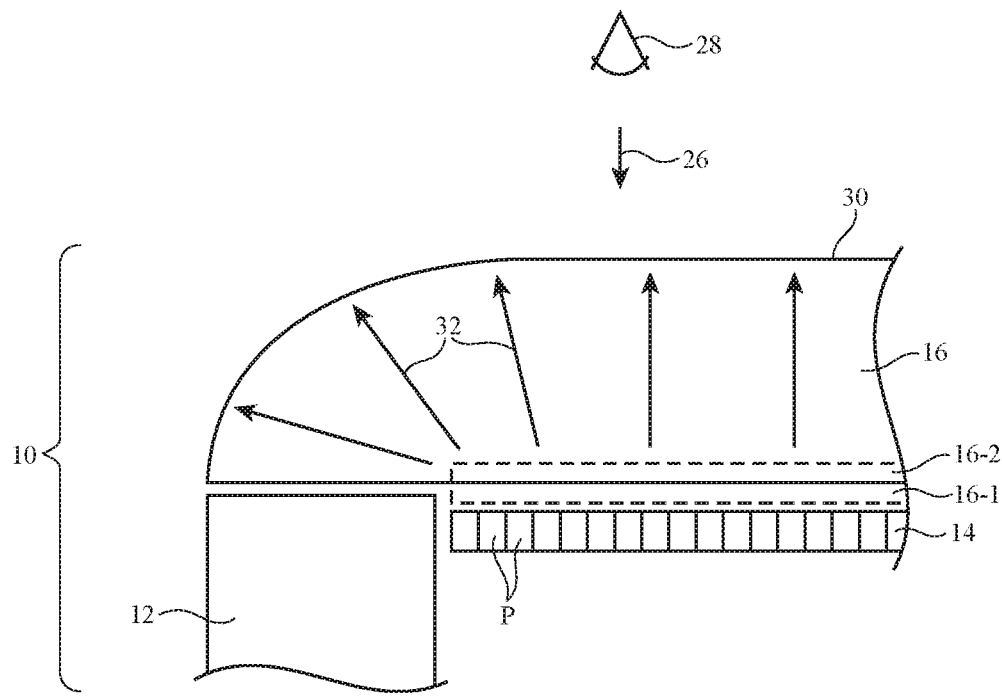
FIGS. 2 and 3 are cross-sectional side views of portions of illustrative electronic devices in accordance with embodiments.

During operation, light from pixels P (e.g., peripheral pixels P near the left, right, top, and bottom edges of device 10 when viewed in direction 26) may be directed in a desired direction by the light redirecting element(s) of device 10. For example, one or more of the light redirecting elements of FIG. 1 (e.g., element 16-1 or 16-2) may cause emitted light 32 from peripheral pixels P (or other pixels P that are overlapped by the light redirecting elements and/or are otherwise in the vicinity of the light redirecting elements) to be directed toward peripheral portions of display cover layer 16 as shown in FIGS. 2 and 3.

Figure 3:
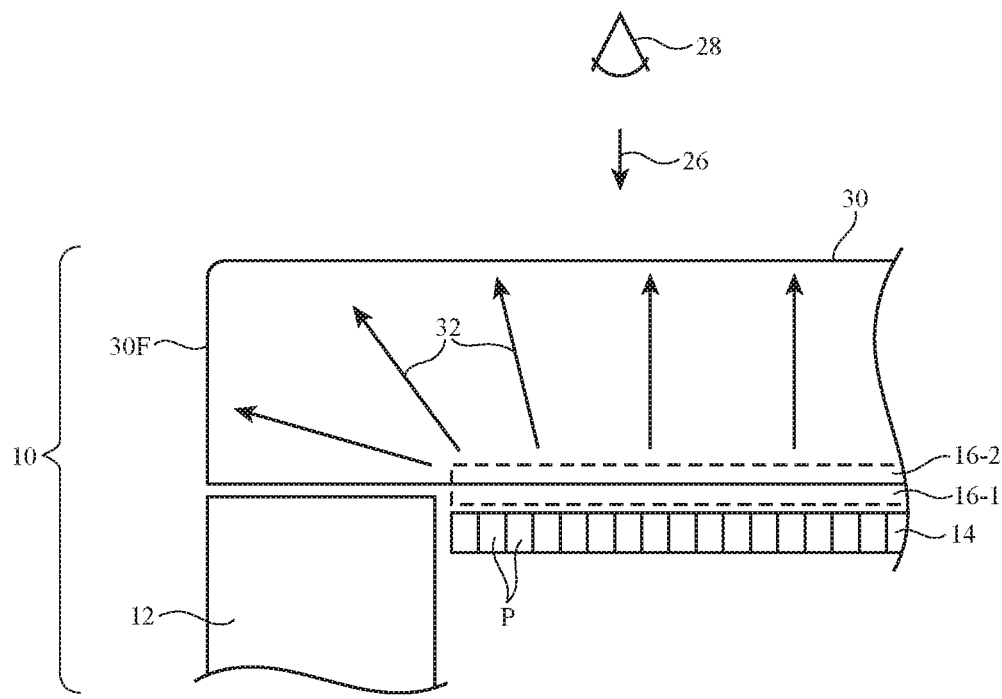

Outer surface 30 of display cover layer 16 at the periphery of device 10 may have a curved cross-sectional profile (see, e.g., the rounded edge profile of layer 16 in FIG. 2) or may be characterized by one or more planar portions (see, e.g., the flat vertical sidewall portion 30F of layer 16 in FIG. 3 which has a surface normal perpendicular to the surface normal of display 14). Light redirecting elements 16-1 and/or 16-2 may direct light outwardly as shown in FIGS. 2 and 3 so that some of the light from pixels P visually overlaps housing 12 (from the perspective of viewer 28) and thereby effectively enlarges the size of display 14 and minimizes inactive display borders and/or so that some of the light from pixels P creates an image or diffuse glow on a sidewall of layer 16 (e.g., planar sidewall portion 30F of FIG. 3).

Pixels P may be distributed evenly or unevenly. For example, even pixels (or odd pixels) may be omitted in peripheral portions of display 14 and/or the pitch (pixel-to-pixel spacing) of pixels P may otherwise be varied across the surface of display 14. If desired, pixel size may vary across display 14. For example, pixels P may be smaller in the center of display 14 than near the periphery of display 14. Pixel size, brightness, color, shape, density, center-to-center distance, and/or other pixel attributes may be constant, may be varied in a stepwise fashion, may vary continuously, and/or may otherwise be different in different areas of display 14.

The light that is redirected by the light redirecting elements may form integral (peripheral) areas of the image on the front face of device 10, may form separate images (e.g., icons for virtual buttons, text, and/or other image content that does not form an integral portion of an image on the front of device 10), may form blurred content and/or other low resolution content, and/or may form a solid band of light of a desired color (e.g., a diffuse glowing edge region). If distortion is imparted by the light redirecting elements, this distortion can be compensated for during precompensation operations (e.g., adjusting the data supplied to pixels P proactively so that pixels P produce light output values that result in desired images being visible to the user after light 32 passes through the light redirecting elements). In configurations in which the size of the image on display 14 is effectively enlarged (e.g., by directing light from peripheral pixels laterally outward to make the image larger), opaque portions of device 10 such as portions of housing 12 can be hidden from view, making display 14 borderless or nearly borderless. In configurations in which a diffuse glow is provided along vertical sidewall portions or other edge portions of device 10, the appearance of device 10 may be enhanced. In configurations in which virtual buttons are displayed (e.g., icons associated with touch screen input provided using a two-dimensional touch sensor in display 14 or elsewhere under display cover layer 16), the ability of device 10 to gather user input and provide output to the user may be enhanced.

FIG. 4 shows how light redirecting element 16-2 may be formed from lens structures on the lower surface of display cover layer 16. The lens structures of element 16-2 in FIG. 4 may be, for example, Fresnel lens elements. Lens structures on the lower surface of layer 16 may be formed by etching layer 16 into a desired shape, by machining layer 16 into a desired shape, by molding layer 16 into a desired shape, or by otherwise forming lenses directly in layer 16. With this type of arrangement, the Fresnel lens elements of element 16-2 of FIG. 4 and layer 16 are formed from integral portions of the same material. If desired, a polymer coating or other transparent coating with lens elements may be formed on the lower surface of layer 16 and/or an optical film (e.g., a polymer film) containing lenses (lens elements) may be attached to the lower surface of layer 16 with adhesive. FIG. 5 shows how lenses for element 16-2 may have rounded (curved) cross-sectional profiles. The lenses of element 16-2 may, for example, be elongated lenses with circular or nearly circular cross-sectional shapes (e.g., cylindrical lenses or other lenticular lenses) as shown in the top view of FIG. 6 or may be semispherical lenses with round (or nearly round) footprints (outlines) as shown in the top view FIG. 7. Round lenses such as the lenses in the lens array of FIG. 7 may be microlenses and may have a shared common diameter or may be characterized by multiple different diameters (as examples). Lens dimensions may be smaller than pixel dimensions, comparable to pixel dimensions, or larger than pixel dimensions.

Figure 8:
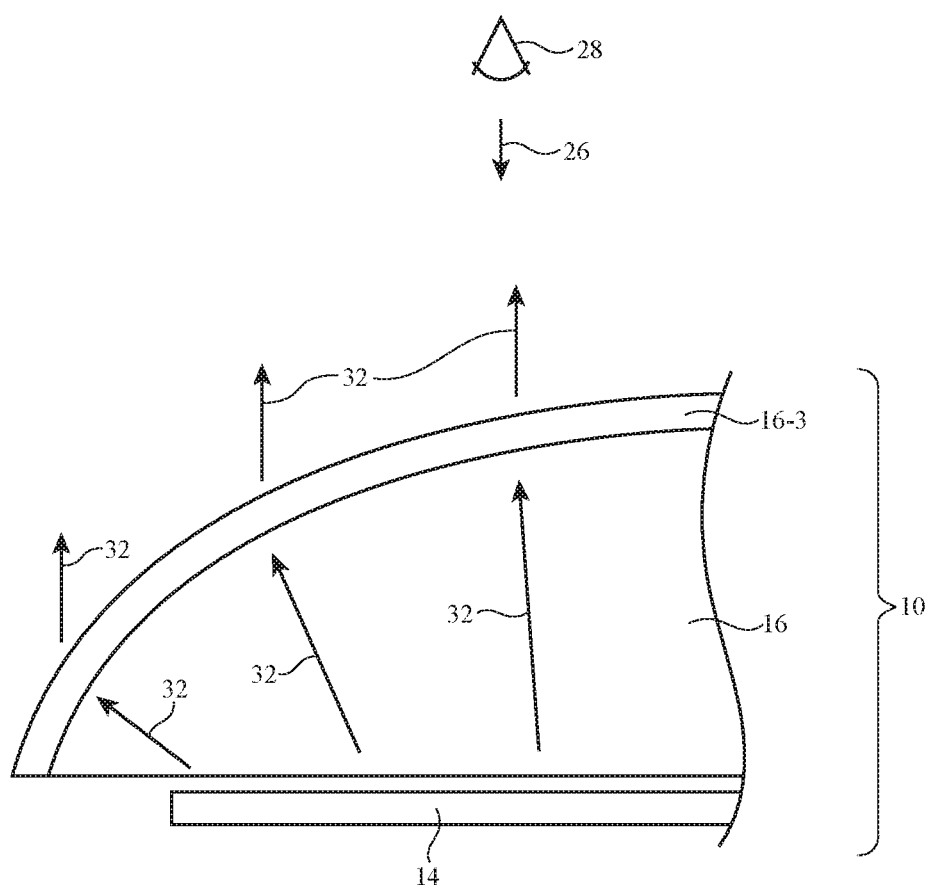
FIG. 8 is a cross-sectional side view of an illustrative display and display cover layer with an outer optical layer that redirects light in accordance with an embodiment.

In the example of FIG. 8, light redirecting element 16-3 has been formed on the outer side of member 16 (e.g., as a thin-film coating, as a laminated layer, as an integrated portion of layer 16, etc.). Light redirecting element 16-3 may help redirect light from peripheral pixels P in display layer 14 upwards in the Z direction so that this light may be viewed by viewer 28 who is viewing device 10 in direction 26.

Figure 9:
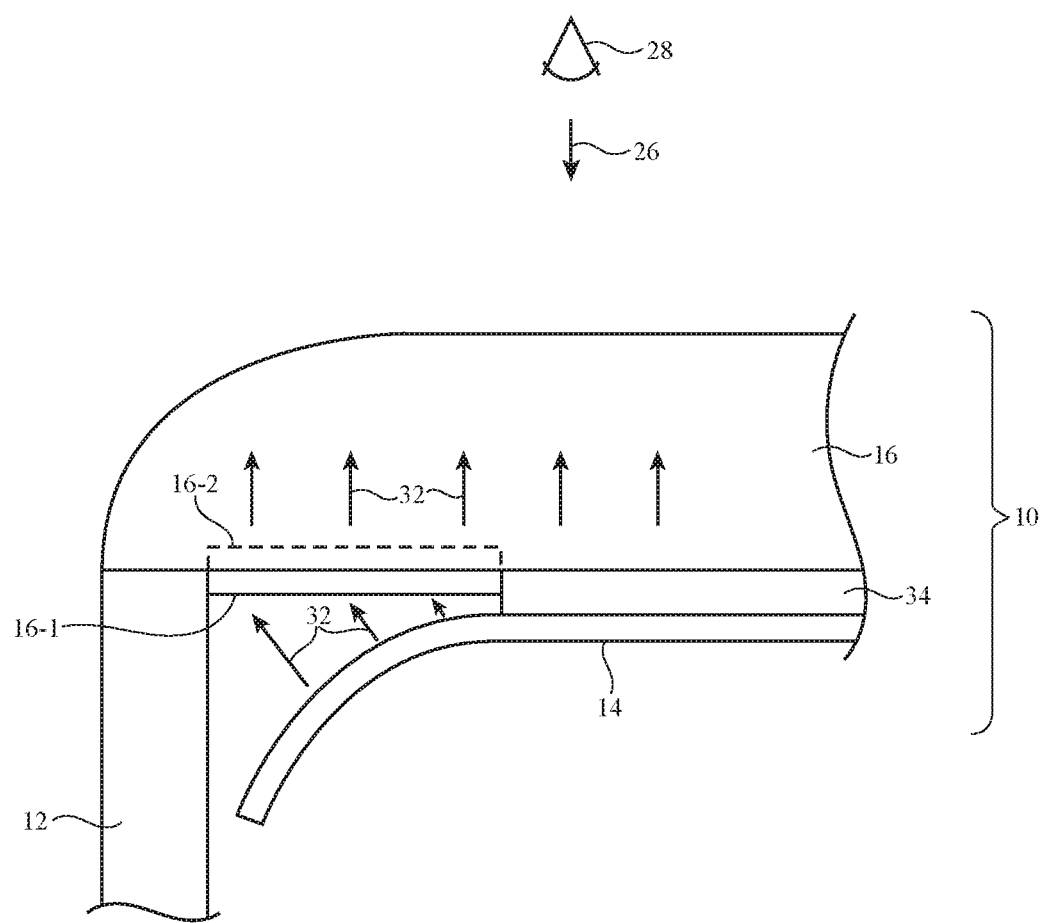
FIG. 9 is a cross-sectional side view of an edge portion of an illustrative electronic device having a flexible display with a bent edge and having a light redirecting element in accordance with an embodiment.

Display 14 may, if desired, have bent portions. For example, as shown in FIG. 9, display 14 may be bent away from display cover layer 16 along one or more peripheral edges of device 10. In the example of FIG. 9, optically clear adhesive 34 has been used to attach display 14 to the inner surface of display cover layer 16 and light redirecting element 16-1 (and/or element 16-2) has been formed on the inner surface of layer 16 along the peripheral edge of device 10. If desired, optically clear adhesive may be formed over all of display 14 or other portions of display 14. Optically clear adhesive or other clear polymer material may, if desired, have a different (e.g., lower) refractive index than the material used in forming adjacent light redirecting elements. If desired, air gaps may be formed adjacent to light redirecting elements.

Figure 10:
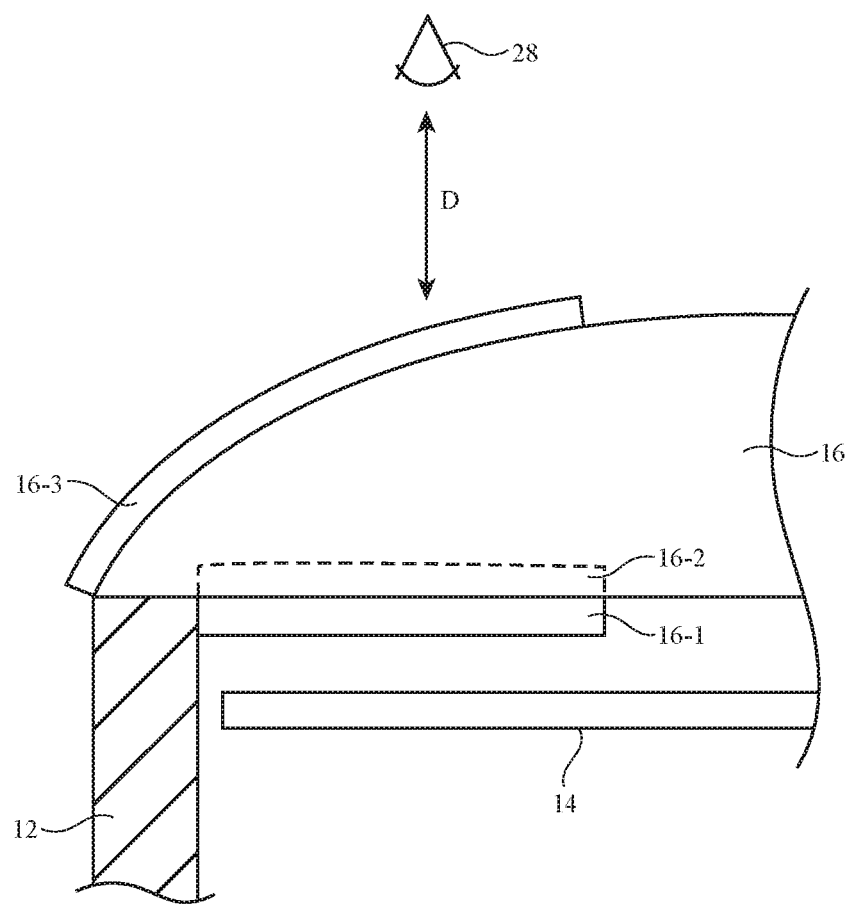
FIG. 10 is a cross-sectional side view of an illustrative display cover layer with an afocal optical system formed from upper and lower optical elements that redirect light in accordance with an embodiment.

FIG. 10 shows how light redirecting elements may be present on both the outer and inner surfaces of display cover layer 16. As shown in FIG. 10, light redirecting element 16-3 may be formed on a first (outwardly facing) side of display cover layer 16 and light redirecting element 16-2 (or 16-1) may be formed on a second opposing (inwardly facing) side of display cover layer 16. The outer light redirecting element and the inner light redirecting element in this type of configuration may form an afocal optical system. Use of an afocal configuration for the light redirecting elements of display cover layer 16 allows light 32 to be directed in a desired direction by the light redirecting elements while creating an optical system in which the size of images that are viewed by viewer 28 on display 14 do not change with changes in distance D between viewer 28 and layer 16.

Figure 11:
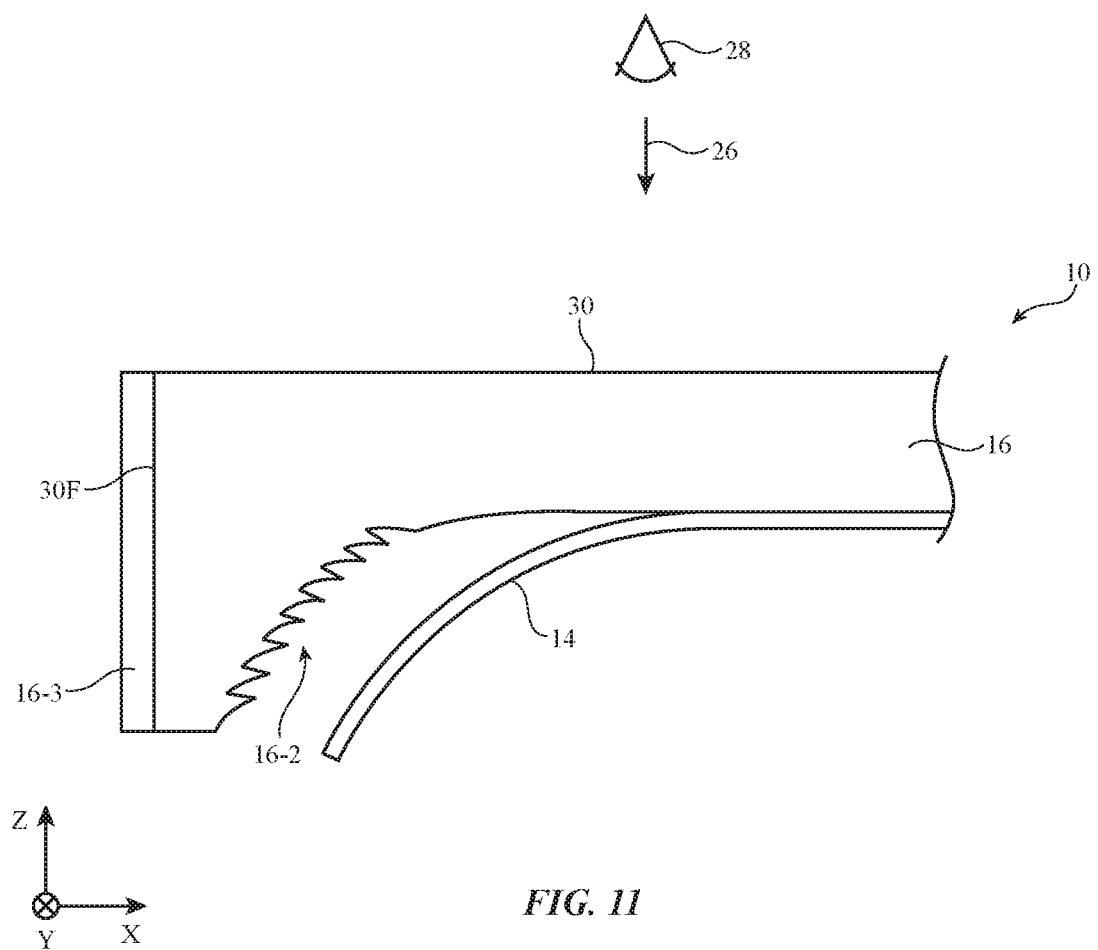
FIG. 11 is a cross-sectional side view of an illustrative electronic device with a curved display portion and a display cover layer having Fresnel lens structures in accordance with an embodiment.

In the example of FIG. 11, light redirection element 16-2 has been formed on a curved edge portion of display cover layer 16. The curved cross-sectional profile of the inner surface of display cover layer 16 in FIG. 11 may bend in the same direction as display 14 near the periphery of display 14. Fresnel lenses (e.g., an array of Fresnel lens elements) or other optical structures may be used in forming element 16-2.

Figure 12:
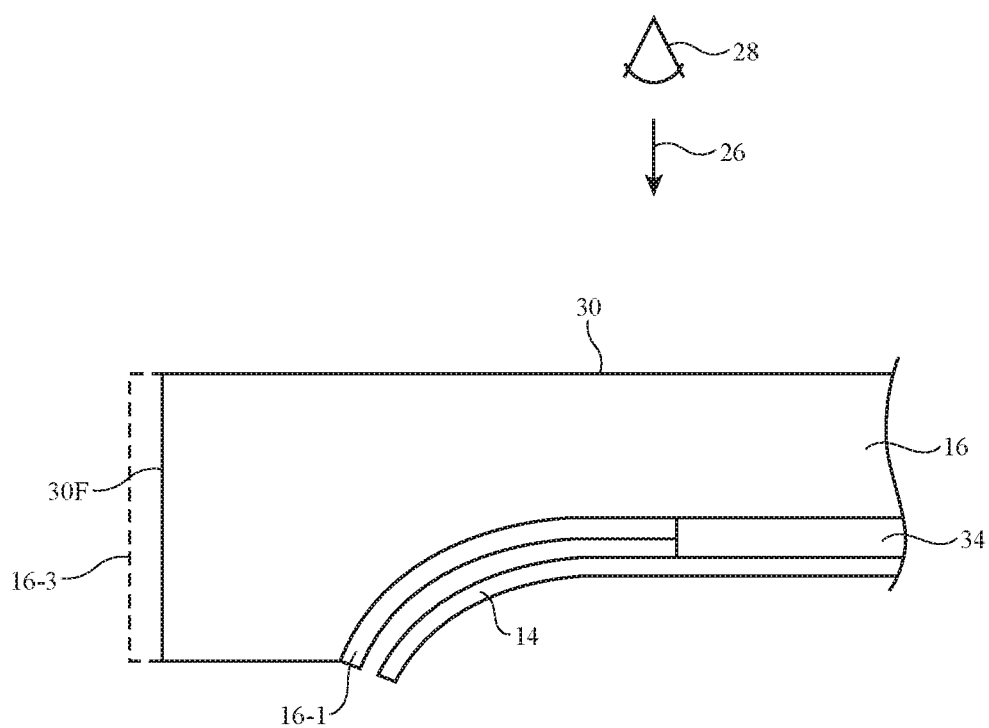
FIG. 12 is a cross-sectional side view of an illustrative electronic device with a display cover layer having a curved inner surface on which an optical element has been formed in accordance with an embodiment.

Optional outer light redirecting element 16-3 is formed on planar vertical sidewall surface 30F of member 16 in the example of FIG. 11. FIG. 12 shows how a separate light redirecting element (element 16-1) may be formed from a coating or flexible layer on a curved portion of the inner surface of a peripheral portion of display cover layer 16. Optional optically clear adhesive 34 may be used to attach display 14 to the inner surface of layer 16 in the center of device 10. Optional light redirecting element 16-3 may be formed on a planar surface such as vertical surface 30F and/or layer 16 may have a curved edge profile.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
   a housing;
   electrical components in an interior of the housing;
   a display having an array of pixels configured to emit light; and
   a planar display cover layer that overlaps the array of pixels and that is coupled to the housing, wherein the planar display cover layer has a surface with a rounded portion facing the display, wherein the planar display cover layer comprises a light redirecting element on the rounded portion of the surface, wherein the light redirecting element is formed from a coating or flexible layer on the rounded portion of the surface, the light redirecting element is selected from the group consisting of: a refractive light redirecting element and a diffractive light redirecting element, wherein the planar display cover layer has edges, wherein the light redirecting element is adjacent to at least one of the edges, and wherein the display has a bend that follows the rounded portion of the surface.

2. The electronic device defined in claim 1 wherein the light redirecting element comprises a light redirecting element selected from the group consisting of: a hologram, a grating, and a set of lenses.

3. The electronic device defined in claim 1 wherein the light redirecting element comprises Fresnel lenses.

4. The electronic device defined in claim 1 wherein the light redirecting element comprises lenticular lenses.

5. The electronic device defined in claim 1 wherein the light redirecting element has round lenses.

6. The electronic device defined in claim 1 wherein the light redirecting element has a side with a curved cross-sectional profile, the side facing the display.

7. The electronic device defined in claim 1 wherein the display comprises a flexible display and wherein the bend of the display forms a bent peripheral portion of the display containing peripheral pixels in the array of pixels.

8. The electronic device defined in claim 1 wherein the display comprises a bent peripheral portion based on the bend of the display, wherein the light redirecting element has a curved cross-sectional profile, and wherein the light redirecting element comprises lenses.

9. The electronic device defined in claim 1 wherein the planar display cover layer has opposing outer and inner sides, wherein the light redirecting element is on the inner side of the planar display cover layer, wherein the electronic device further comprises an additional light redirecting element on the outer side of the planar display cover layer, wherein the light redirecting element and the additional light redirecting element are configured to form an afocal system, wherein the light redirecting element comprises a light redirecting element selected from the group consisting of: a hologram, a grating, and a set of lenses, and wherein the additional light redirecting element comprises a light redirecting element selected from the group consisting of: a hologram, a grating, and a set of lenses.

10. An electronic device, comprising:
a housing;
electrical components in an interior of the housing;
a display having an array of pixels configured to emit light;
a display cover layer that overlaps the display and that is coupled to the housing, wherein the display cover layer has a planar sidewall surface with a surface normal that is perpendicular to a surface normal of the display; and
a light redirecting element that overlaps peripheral pixels in the array of pixels and that redirects light from the peripheral pixels to the planar sidewall surface.

11. The electronic device defined in claim 10 wherein the display cover layer has an inner side and wherein the light redirecting element is at the inner side.

12. The electronic device defined in claim 11 wherein the light redirecting element is formed from portions of the display cover layer.

13. The electronic device defined in claim 11 wherein the light redirecting element is formed from a light redirecting layer that is attached to an inwardly facing surface of the display cover layer.

14. The electronic device defined in claim 13 wherein the inwardly facing surface of the display cover layer has a curved cross-sectional profile.

15. The electronic device defined in claim 10 further comprising an additional light redirecting element on the planar sidewall surface.

16. The electronic device defined in claim 10 wherein the light redirecting element comprises an optical layer selected from the group consisting of: a hologram layer, a grating layer, and a layer of lenses.

17. An electronic device, comprising:
a housing;
electrical components in an interior of the housing;
a display having an array of pixels configured to emit light; and
a display cover layer that overlaps the display and that is coupled to the housing, wherein the display cover layer has opposing inner and outer surfaces, wherein the outer surface has a peripheral portion with a curved cross-sectional profile, wherein the inner surface has a peripheral portion with a curved cross-sectional profile, wherein the peripheral portion of the inner surface with the curved cross-sectional profile is configured to form lens elements that redirect light emitted from peripheral pixels in the array of pixels, and wherein the lens elements have round outlines and face the peripheral pixels.

18. The electronic device defined in claim 17 wherein the lens elements comprise lenticular lenses.

19. The electronic device defined in claim 17 wherein the display has a bent peripheral portion that follows the curved cross-sectional profile of the peripheral portion of the inner surface.

20. The electronic device defined in claim 19 wherein the peripheral pixels are formed on the bent peripheral portion of the display.

* * * * *